July 10, 1928.  1,676,521
F. CARTER
HARVESTING MACHINE FOR SOY BEANS AND THE LIKE
Filed Oct. 10, 1925    3 Sheets-Sheet 3

Patented July 10, 1928.

1,676,521

UNITED STATES PATENT OFFICE.

FLOYD CARTER, OF GRIDLEY, ILLINOIS.

HARVESTING MACHINE FOR SOY BEANS AND THE LIKE.

Application filed October 10, 1925. Serial No. 61,737.

My invention relates to harvesting machines for soy beans, cow peas, and the like.

One of the objects of the invention is in the provision of a harvesting machine for soy beans and the like, the same being adapted to be drawn through the fields in a manner to harvest the beans without shattering same, prior to their entrance to the machine, and after entrance into the machine to prevent, to a great extent, any cracking of the seed.

Another object of the invention is in the provision of a harvesting machine for soy beans and the like, capable of passing through a field, irrespective of the manner of sowing therein, raising the vines in such manner that the peculiarly fashioned reel member may thresh the beans from the vines directly into the machine, where the seeds will be progressively elevated to a position in which the pods will be blown away and the seeds automatically caught in bags or other receptacles.

Still another object is in the provision of a harvesting machine for soy beans and the like, said machine being of such light draft as to permit ready movement through the fields, there being provided a special reel member having beater portions that descend vertically into the vines and, in their rearward movement, thresh the beans directly into the machine.

Yet another object of the invention is in the provision of a harvesting machine for soy beans and the like having a reel member operated by the draft of the vehicle in its movement through the field, said reel member being fashioned with beater members that descend in a substantially vertical manner into the vines and in the gathering movement beat the beans in the direction of a receiving hopper, as well as forcing the vines against a yielding grid member.

A still further object of the invention lies in the combination of parts assembled in the complete harvesting machine that is adapted to raise the vines of soy beans and the like, gather the beans therefrom, thresh the pods from the seed, remove the pods, and finally catch the seeds in proper receptacles, all of the operations and mechanisms therefor depending upon the natural draft of the machine.

Other objects of the invention will appear in the following specification, taken in connection with the annexed drawings, in which—

Figure 1:
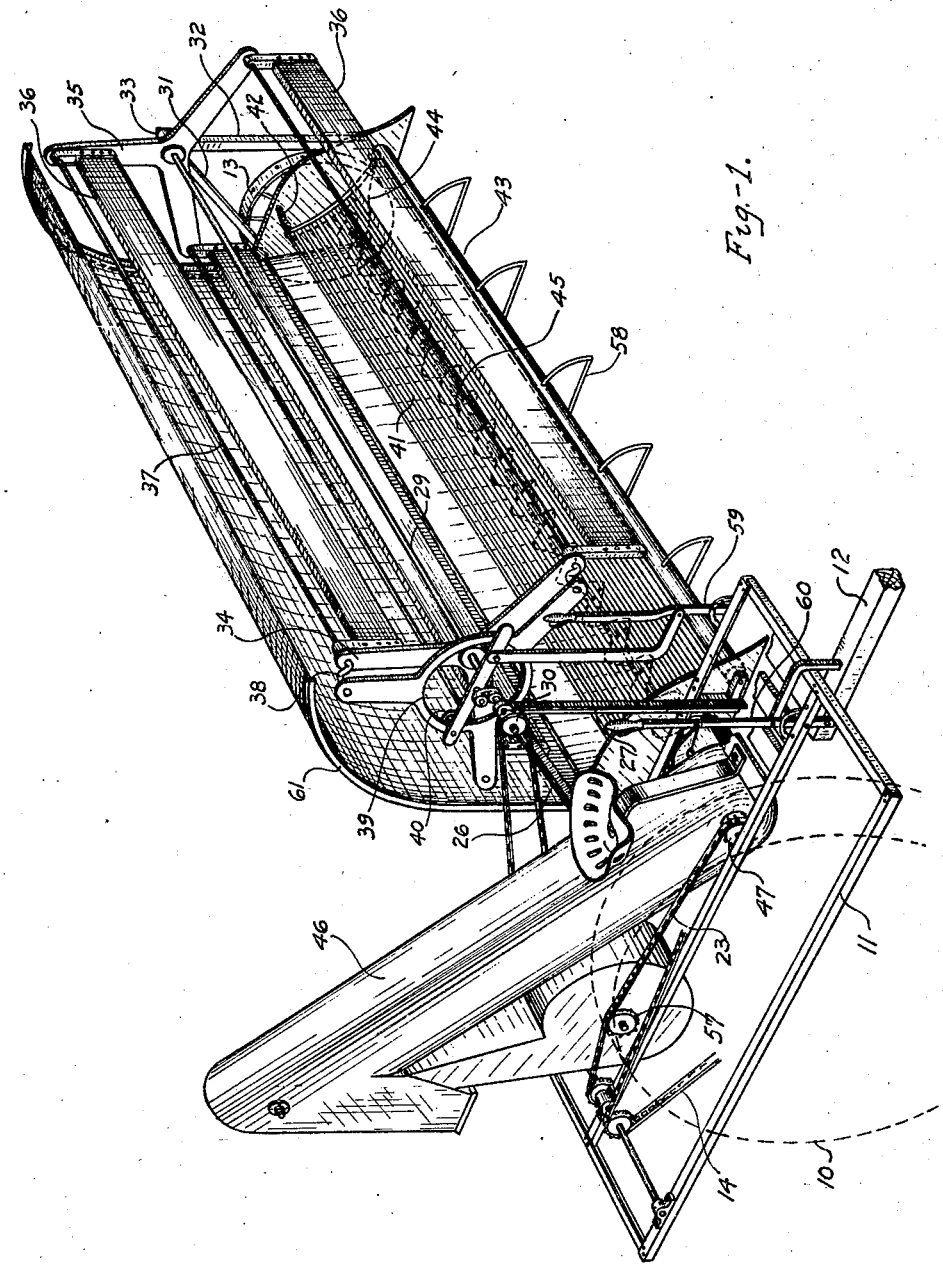
Fig. 1 is a perspective view of my harvesting machine.
Figure 2:
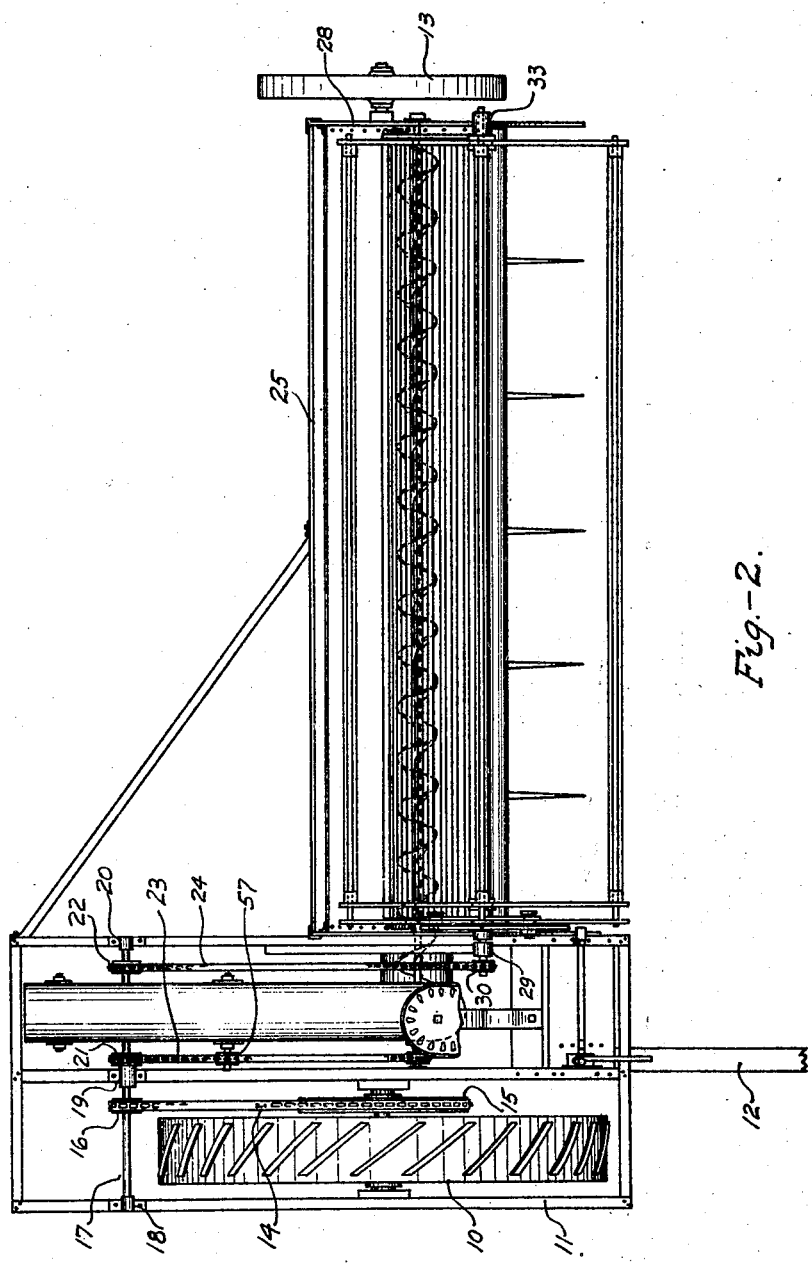
Fig. 2 is a top plan view of the machine.
Figure 3:
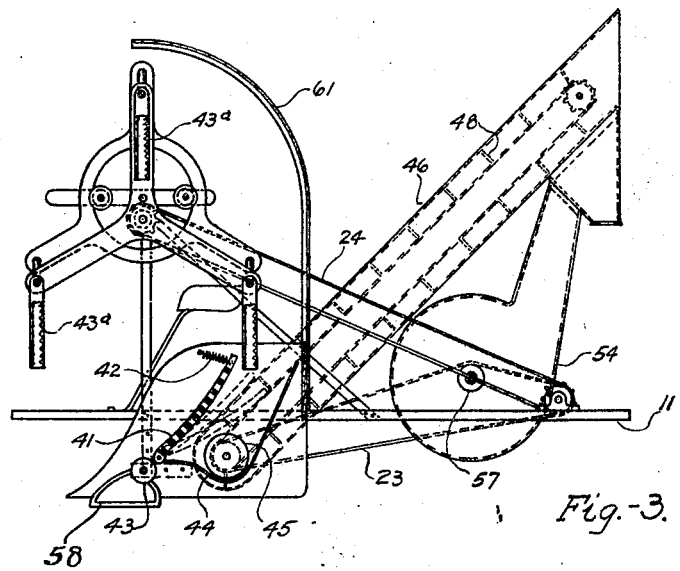
Fig. 3 is a cross-sectional view, showing in detail the special beater member and its relation to the grid portion and conveyor members.

Before describing the harvesting device herein for soy beans and the like, it might be said that a problem has been presented to the farmer in the changing of his crops for the protection of the soil, due to the fact that the formerly large demand for oats, the usual changing crop, has decreased to such an extent as to practically prohibit planting of this crop to any extent, if a profit is to be gained. This condition is prevalent throughout the country, but especially in the Central West, where the oat and corn crops have been interchanged regularly, without affecting the soil.

In view of the fact that soy beans and the like are good soil changing crops, a gradually increasing acreage each year is being planted with this crop: The only objection to a crop of this kind is the difficulty in harvesting, the ordinary method used being that the vines are cut and later threshed. This not only requires two operations, but also makes necessary the distribution of the vines again upon the fields, if the fertilizing effect of the same is to be had. Another manner of harvesting is to have a machine drawn through the field, having a beater or reel member rotating in a manner to thresh the beans into the machine and thereafter to sack the seed.

Applicant's device follows the latter method, with the exception that his machine has been improved with respect to the gathering of the beans and particularly with respect to the beater or reel member so called herein.

Referring to the drawings, applicant's device takes the form of a well known harvesting machine, wherein there is a main drive wheel 10, surrounding which is a frame portion 11 attached in the well known manner thereto, said frame portion being adapted to be drawn, as shown herein, by horses, not shown, hitched to a tongue member, a portion of which is designated at 12.

The opposed end of the harvesting machine is supported by a smaller wheel 13. Driving means for the various portions of the device originate with the chain 14, riding on a sprocket 15 attached to the main drive wheel. The chain 14 transmits power to a sprocket 16, which in turn rotates a shaft 17 supported in suitable bearings 18, 19 and 20 on the frame portion. This shaft 17 has located thereon sprockets 21 and 22, which in turn transmit power through chain members 23 and 24, to the blower elevator, helix conveyor and beater, respectively, the same to be later described.

The frame portion 11 is extended in the manner shown at 25, 26, 27 and 28, to provide a supporting means for the specially fashioned beater or reel member. This beater, or reel member, is made up of the following portions: The drive shaft 29, or axis of the reel, has a sprocket 30 on its inner end, the same being driven by the chain 24. The axis 29 is supported at one end by the frame portions 26 and 27, and at the opposite end by the frame portions 31 and 32, which form a bearing for the opposite end of the shaft 29 at their apex 33. Attached to the shaft 29 and rotated thereby, are the radially extending series of arms 34 and 35, which are disposed respectively at either end of the reel and fashioned to have extended therebetween the actual beater members 36, said beater members being fixed to rods 37, the inner ends of which are bent at 38, to permit cam movement controlled by a well known type of cam structure, including the cam track 39 and cams 40. Beater members 36 are here shown as boards of suitable length and thickness, but other material may be used if desired.

From the above, it may be readily seen that the beater members, due to the cam action, will move in a substantially vertical manner downwardly upon rotation of the reel, induced by forward movement of the harvester.

Applicant has devised this particular type of beater for operating upon the beans on the vine to avoid the use of the ordinary cylinder beater, which has a tendency to scatter a portion of the beans upon the ground prior to the ascending movement, or rearward movement of the beater, which normally gathers the beans and threshes the seed from the pod directly into the machine. Applicant depends upon this downward vertical movement of the beaters into the vines, to prevent this initial scattering of the beans upon the ground.

The bean gathering mechanism includes further the concave grid 41, disposed in the path of the beater members, and being yieldingly held in operative relation thereto by means of the coil springs 42. A cylindrical deflecting member 43 is positioned at the lower edge of the grid, to present a smooth surface to the plants and thereby avoid pulling the plants out of the ground, which would result in clogging the grid and drawing the vines into the machine as the beater members force the tightly clinging beans from the vine in their ascending movement across the yielding grid.

Applicant has disclosed but a single type of mechanism for producing this substantially vertical movement of the beater members into the vines, and it is obvious that there is contemplated any type of cam mechanism which will produce this result. Similarly, but three beaters are shown, and it is very possible that in the harvesting of different types of beans, an even greater number of beaters might be necessary. Also, it will be noted that the active faces of the beater members have abutments or corrugations 43$^a$ thereon, which have a sort of washboard action on the vines or beans thereon, in their travel over the grid.

Figure 4:
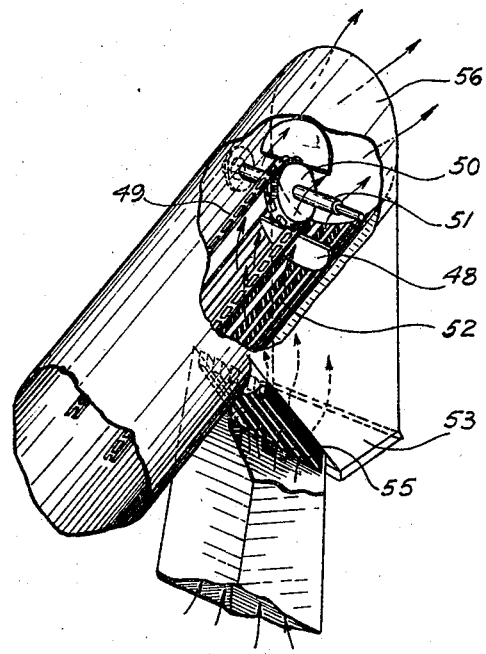
Fig. 4 is an enlarged detail view, partially in section, showing the manner of removing the pods from the seed by blast action.

A hopper portion 44, disposed below the concave grid 41, has a screw conveyor 45 therein that is adapted to carry the shattered pods and seed to the receiving end of an elevator 46. The driving means for the screw conveyor includes a sprocket 47 disposed at the outer end of the helix conveyor and driven by the before mentioned chain member 23. This driving mechanism also provides power means for the flights 48, thus forming the endless conveyor or elevator 46. The elevator comprises the endless chain 49, passing over an idler 50, which is supported on the shaft 51, the same being held in suitable bearing members in the upper end of the elevator. The flights 48 are adapted to pick up the shattered pods and the seed delivered thereto by the screw conveyor, and to elevate same to a point shown in Fig. 4, where the seeds drop through a grating 52, upon the lower side of the elevator, and through a spout 53 into any waiting receptacle, such as a bag, that is desired. To prevent the dropping of the shattered pods through the grating 52, a fan 54 of well known design sends a blast of air upwardly through a second grate 55, thence through the first named grate 52 with such force as to expel said shattered pods from the open upper end 56 of the elevator.

The fan 54 has power transmitted thereto by the before mentioned chain 23, which rides upon a sprocket 57, having operative connection with said fan.

Guard members 58 are secured to the cylindrical member 43 and extend forwardly thereof in a manner to assist in the picking up and disentangling of any of the fallen vines, so that they may be more effectively engaged by the beaters.

Hand operated means has been shown, as at 59, to facilitate changing the degree of inclination of the beater members, and similarly, a second hand operated means 60 is provided for tilting the entire harvesting frame, including the operating portions thereon.

Surrounding the reel in a protecting manner, is a shield 61, preventing any possible scattering of the seed upon the ground, due to the rapid beating action.

What I claim is:

1. A harvesting machine for beans, comprising a rotatable reel, flat beaters carried by said reel and positioned to engage the standing bean plants, means for retaining said beaters in vertical position during the rotation of the reel, a yielding grid disposed in the path of said beaters and cooperating with said beaters to thresh the beans from the plants, a transverse hopper positioned below said grid to receive the threshed beans, and a screw conveyor operating in said hopper to remove the beans therefrom.

2. A harvesting machine for beans, comprising a rotatable reel, flat, corrugated beaters carried by said reel and positioned to engage the standing bean plants, means for retaining said beaters in vertical position during the rotation of the reel, a yielding grid disposed in the path of said beaters to be engaged and depressed by the lower edges thereof to thresh the beans from the plants, a transverse hopper positioned below said grid to receive the threshed beans and husks, a screw conveyor operating in said hopper to remove the beans and husks therefrom, and means for separating the husks from the beans.

3. A harvesting and threshing machine for beans, comprising a rotary reel, a plurality of flat beaters carried by said reel and positioned to engage the standing bean plants, mechanism for retaining said beaters in vertical position during the rotation of the reel, a yielding grid disposed in the path of said beaters to be engaged and depressed by the lower edges thereof to thresh the beans from the plants, a transverse hopper positioned below said grid to receive the threshed beans and husks, a conveyor operating in said hopper to remove the beans and husks therefrom, a cylindrical member disposed at the forward edge of said grid, and guard members secured to said cylindrical member and adapted to raise the plants into position to be engaged by said beaters.

In testimony whereof I have hereunto affixed my signature.

FLOYD CARTER.